United States Patent [19]

Stenbacka

[11] Patent Number: 4,853,173
[45] Date of Patent: Aug. 1, 1989

[54] METHOD OF PRODUCING FUSION REACTIONS AND APPARATUS FOR A FUSION REACTOR

[76] Inventor: Rolf Stenbacka, Vågsättravägen 25, S-141 40 Huddinge, Sweden

[21] Appl. No.: 78,907
[22] PCT Filed: Nov. 27, 1986
[86] PCT No.: PCT/SE86/00542
§ 371 Date: Jul. 24, 1987
§ 102(e) Date: Jul. 24, 1987
[87] PCT Pub. No.: WO87/034.6
PCT Pub. Date: Jun. 4, 1987

[30] Foreign Application Priority Data

Nov. 27, 1985 [SE] Sweden .................. 8505600-0

[51] Int. Cl.⁴ .................................. G21B 1/02
[52] U.S. Cl. ............................. 376/123; 376/107; 376/121; 376/127; 376/144
[58] Field of Search ............. 376/106, 107, 108, 110, 376/111, 112, 113, 119, 120, 121, 127, 129, 142, 144

[56] References Cited

U.S. PATENT DOCUMENTS

| 3,094,474 | 6/1963 | Gale | 376/395 |
| 3,243,348 | 3/1966 | Hansen et al. | 376/107 |
| 3,343,020 | 9/1967 | Gordon | 376/107 |
| 3,344,357 | 9/1967 | Blewett | 376/102 |

FOREIGN PATENT DOCUMENTS 1422545 1/1976 United Kingdom.
1546247 5/1979 United Kingdom.

OTHER PUBLICATIONS

Plasma and Controlled Fusion, David J. Rose, Melville Clark, Jr., The M.I.T. Press, 1961.

Primary Examiner—Deborah L. Kyle
Assistant Examiner—Richard W. Wendtland
Attorney, Agent, or Firm—Oblon, Spivak, McClelland, Maier, & Neustadt

[57] ABSTRACT

A method of producing fusion reactions comprises the steps of bringing deuterium ions from an ion source to run in a substantially closed path for accumulation of the ions to a predetermined density, whereupon the ions are deflected towards a reaction center inside this closed path. An apparatus for a fusion reactor includes two annular, coaxially disposed magnets (12,20) which are disposed to produce magnetic fields in a vacuum tank. The inner magnet (20) produces a homogenous field transversely to the plane in which deuterium ions are intended to circulate prior to reaction, and the outer magnet (12,14) produces an inhomogenous field which decreases outwardly in radial direction and is also directed transversely to said plane. Electrodes (16,18) are provided to produce a radial electric field in the area having said inhomogenous magnetic field, which electric field is directed transversely to this inhomogenous field. A deuterium ion source (24) is arranged to inject ions in a path in said area having an inhomogenous magnetic field and a reaction center (34) is disposed in the tank, in the center of the inner magnetic ring, towards which center ions in said path are deflected by changing the electric field.

11 Claims, 7 Drawing Sheets

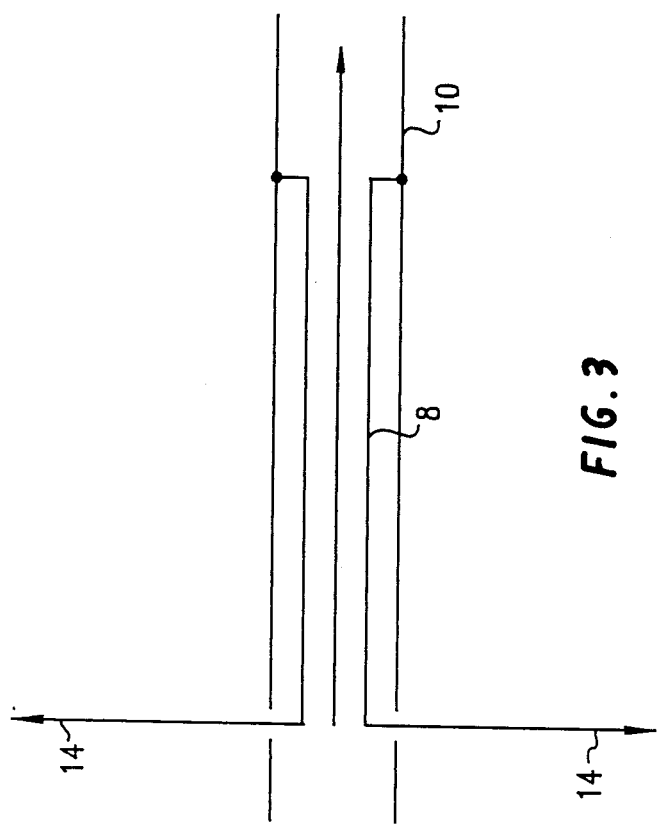

METHOD OF PRODUCING FUSION REACTIONS AND APPARATUS FOR A FUSION REACTOR

The present invention relates to a method of producing D-D fusion reactions as well as an apparatus for a fusion reactor.

In order to produce an energy producing fusion reaction the so-called Lawson criterium must be fulfilled, that is the product of the confinement time of the particles and the density must exceed $10^{14}$ cm$^3$.s for an ion temperature of 50 keV, see e g Furth, Physica Scripta, vol. T2/2, 1982, pages 324–335, International Conference on Plasma Physics, Editor H. Wilhelmsson.

Losses caused by instabilities and other scattering phenomena in the fusion plasma so far have made it impossible to fulfill this criterium for energy producing fusion reactions.

The object of the present invention is to propose a new method of energy production by fusion reactions, preferably D-D (D deuterium) reactions, the movements of the particles being totally controlled and kept in well defined stabilized orbits up to the time of the reaction, as well as to provide an apparatus which functions correspondingly and has a positive energy balance.

This object is obtained by a method according to claim 1 and an apparatus according to claim 7.

From Physics Reports (Review of Physics Letters) 58, No. 2 (1980), pages 73–119 a technique is known for obtaining a high degree of control of particle beams, it then being possible to keep the beam in a circulating orbit for a very long time.

According to the present invention the fusion reactions are produced periodically.

The advantages of the apparatus according to the present invention are that no untried technique is used for the construction. Without exceptions ordinary magnetic materials and conventional vacuum pumps, ion sources, accelerators, beam optic equipment and moderators as well as equipment for converting heat to electric current are used.

Additional advantages reside in the fact that no extreme electric or magnetic fields are required. Subsequent to a reaction in the apparatus according to the invention scattered particles are absorbed in the walls of the apparatus, but blanket and wall problems are reduced by using D-D reactions, since in that case no tritium recovery is required. In this way ordinary wall materials can be used. Heavy paraffin containing deuterium can be used round the reaction centre as a moderator as well as a target for particles which are scattered from the primary reaction, as well as for energy conversion.

By taking into consideration the various reactions which may occur in connection with the invention, e g the desirable D-D fusion reaction, elastic Coulomb scattering between individual charges, the cumulative effect of multiple Coulomb scattering, charge exchange, electric forces and magnetic pinch effects on the annular particle beams as well as sputtering, it has been found that the ion energy preferably should be in the range of 0.1 to 3 MeV.

With the present invention fusion reactions are produced periodically with a frequency of $10^5$ to $10^6$ Hz and the density of the ion beam is increased to $10^{14}$ to $10^{16}$ before it is deflected for reaction. An upper limit for the possible particle density in the circulating beam is given by the condition that the potential difference between the centre of the beam and its outer limitation must be small compared to the kinetic energy. This results in a density limit in the range of $10^{14}$ to $10^{16}$ cm$^{-3}$.

An exemplifying embodiment of the fusion reactor according to the present invention will be described in more detail with reference to the attached drawings, on which FIG. 1 shows a principal overall view of the apparatus according to the invention;

FIG. 3 is a schematic lateral view of a pick-up device;

FIG. 4 is an end view of the device in FIG. 3;

Figure 1:
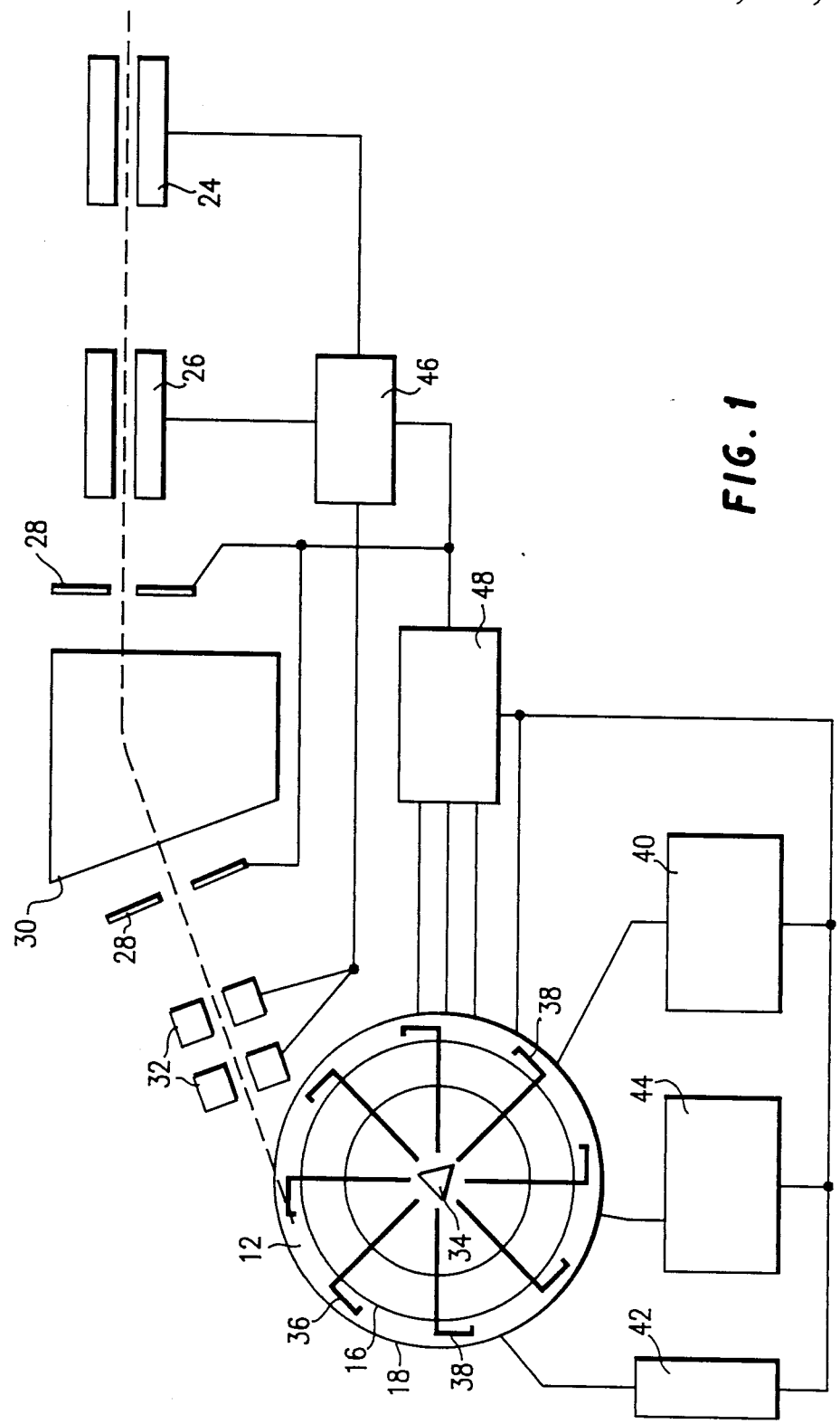

FIG. 1 is an overall top view of the apparatus according to the invention. An ion source 24 delivers deuterium ions which are accelerated in a preferably linear accelerator 26. The beam of the accelerated ions passes beam optical means, e g beam forming apertures 28, an impulse magnet 30 and a quadropole lens 32 for focusing and injection into the area in a storage magnet 12.

The ion beam is circulated inside the storage magnet 12, until a sufficient amount of particles have accumulated, as described in more detail below.

Two concentric electrodes 16, 18 are disposed to produce a substantially radial electric field inside the storage magnet 12 and essentially transversely to its magnetic field. By interaction between this electric field and the field of storage magnet 12 the ion beam is kept in an essentially circular path.

When a desired quantity of particles have been obtained, the beam is deflected into the area inside a convergence magnet 20 which is disposed coaxially with the storage magnet 12, by disconnecting the electric field. The convergence magnet 20 is designed such that its magnetic field deflects the ion beam inwardly towards a reaction centre 34 in the middle of the apparatus.

Alternatively the storage magnet can be designed such that the ion beam is kept in an essentially closed path only by the magnetic field of the storage magnet, the electric field being applied in order to deflect the ions into the area inside the convergence magnet.

The magnetic field in the storage magnet can also be made separately variable for deflection of the ions inwardly towards the reaction centre by variation of this magnetic field.

An an alternative the ion beam can also be composed of positive and/or negative deuterium ions. When both types of ions are used, the different types of ions are replenished separately. When each of the magnet halves is replenished, the ions are moved towards the centre. The space charge effects are reduced in this way and consequently the reaction volume can be reduced resulting in a higher density. After passing the centre the electrons (two from D⁻) have been lost from the D⁻ ion which then becomes positive D⁺. Thus, the replenishment of ions in this case is made with D⁻. The deflection of the ions in the storage magnet can then be accomplished by varying just the magnetic field as described above.

In order to stabilize the ion beam while it is being accumulated inside the storage magnet 12 a technique of stochastic cooling is used, in a manner which is described in more detail below. Pick-up and kicker devices 36 and 38, respectively, are therefore disposed along the beam path in the storage magnet at suitable intervals.

Further, the device comprises vacuum pumps 40, not shown in detail, a generator 42 used to apply a voltage on electrodes 16, 18, power supply equipment 44 for the magnets 12, 20, a power source 46 for the remaining equipment, control equipment 48, including a computer, as well as neutron detectors and other measuring equipment and additional devices for energy conversion from heat to electric energy. These installations are commercially available and will not be described in detail here.

Figure 2:
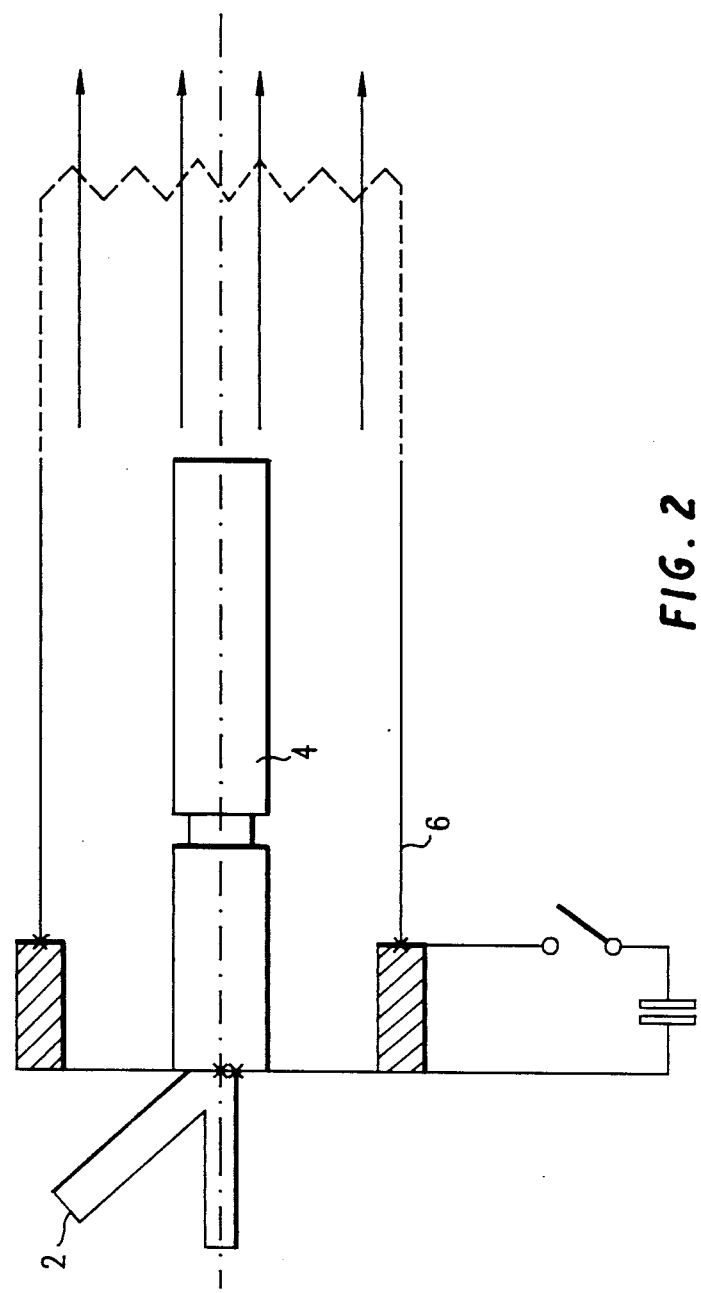
FIG. 2 is a sectional view of a plasma gun which is used as an ion source for injecting deuterium ions into the tank of the apparatus.

Deuterium ions are produced by a suitable ion source 24, as mentioned above. Such a device is shown in FIG. 2 and comprises a coaxial ion gun. Deuterium gas is supplied through the gas supply pipe 2 into the space between two coaxial cylinders 4, 6 which constitute inner and outer conductors. A voltage pulse of 15 kV is applied between the inner conductor 4 and the outer conductor 6, the gas being ionized and the plasma being accelerated by the so-called $j \times B$-force towards the outlet of the gun. j denotes current density and B the magnetic field. In this construction amounts of deuterium ions of up to $5 \times 10^{19}$ can be obtained, accelerated to an energy of 2.5 keV, see Rose and Clark Jr., Plasmas and Controlled Fusion, M.I.T. Press 1965, page 418.

As an alternative ions can be produced in a high-frequency ion source, deuterium ions being fed into an RF-coil, where they are ionized.

About 40 percent of the introduced energy is transferred to the plasma of the gun.

The deuterium ions are then accelerated to the energy range of 0.1 to 3 MeV, as mentioned above. For this purpose a linear accelerator 26 of known type is used which includes a voltage multiplier, in which an alternating current is supplied from a transformer under a certain voltage to a rectifying and multiplying device. About 90% of the energy supplied to the accelerator is transferred to the accelerated particles. The total efficiency of ion source plus accelerator is estimated to about 80 to 90%. This type of accelerator is described in e g Emilio Segré, Nuclei and Particles 1964, W. A. Benjamin, INC, pages 121-149.

The accelerator is followed by suitable magnetic lenses for focusing the deuterium ion beam for injection into the tank of the apparatus. For this suitably quadrupole lenses 32, see FIG. 1, are used as well as the principles of double focusing by a pair of matched magnets in known manner, see e g the abovementioned Emilio Segré, Nuclei and Particles 1964, W. A. Benjamin, INC, pages 121-149.

To stabilize the ion beam which has been injected into the reactor tank, and avoid instabilities a principle of stochastic cooling is used, which is described in Physics Reports (Review Section of Physics Letters) 58, No. 2 (1980), pages 73-119. This is a technique for attenuation by feed-back of undesirable movement components in the phase space in a particle beam. The particles in the beam are then treated individually in the phase space with voids between them. If information about the phase space coordinates for each particle is known, it can be used to exchange empty phase volumes for volumes containing particles, in such a way that the latter are concentrated to small phase volumes while fulfilling the Liouville's theorem, which states that the phase space density in particle beams is maintained in the presence of magnetic and electric fields. Thus, the information about each particle is essential and the rate with which it can be obtained is crucial for the cooling rate. A cooling system to exploit this technique includes a pick-up device 36 which by a broad-band amplifier is connected to a kicker 38. The difficulties of this technique are caused by the fact that the signal, which is induced in the pick-ups by each particle, is very small as well as by the fact that also the smallest resolvable phase volume fractions (samples) contain many particles. However, by using a broad-band technique many small samples can be observed in a given time. The signal delay from the pick-up device to the kicker is made equal to the time of flight of the particle, so that the same sample, which is detected by the pick-up device, is influenced by the kicker. The pick-up device as well as the kicker can be of transverse as well as of longitudinal type.

The stochastic cooling is used for accumulation of several successive particle groups in the storage magnet ring of the reactor, each group filling up an important portion of the available phase volume. A new group is placed adjacent the stacking of the previous ones in the longitudinal phase space. A cooling then reduces the width of the stacking so that space is provided for the next group. A stacking system of this type can give a density increase with a factor of 20,000.

The stochastic cooling technique can also be used to prevent the beam from getting into resonance by giving off stochastic pulses to the kicker.

FIGS. 3 and 4 show a lateral cross-sectional view and and end view, respectively, of a pick-up device which is disposed in the interior of the tank of the apparatus. The pick-up device includes a coupling loop 8 which is connected to tank wall 10. The signal produced in the loop 8 by the ion beam is fed by the conductor 14, as mentioned above, via a broad-band amplifier to the kicker device. By this pick-up device the average position of all particles in the sample of interest is detected and the amplification of the system is adjusted so that the kicker corrects the position of the particles in the desired way.

The kicker device 38 is designed in the same way as the pick-up device 36 and arranged to give velocity correcting impulses to the particles depending on the signal from the pick-up device 36. FIG. 1 shows that a plurality of pick-up and kicker devices can be alternately disposed around the space in the interior of the storage magnet.

Thus, a pick-up device 36 and a kicker loop 38 can be placed at a mutual distance of e g $\pi/2$. If the beam deviates in radial direction from a predetermined mean value this produces a signal in the pick-up device, depending on the size of the deviation. This signal is amplified and fed into the kicker loop which gives a correcting impulse to the beam.

The present invention is primarily intended for deuterium-deuterium reactions. By using this reaction instead of tritium-deuterium reactions certain advantages are achieved. Thus, recovery of tritium is not required and the emission of gamma radiation is reduced considerably. Further, neutrons having a much lower energy are produced, and therefore they cause less damage to the walls and result in less impurities in the reaction centre. Therefore, ordinary materials can be used in the tank walls, e g steel and copper.

An additional advantage resides in that "sputtering" (atomizing) decreases with increasing energy and decreasing atomic number of the target and consequently, these sputtering effects which may be a severe source of impurities, are reduced by D-D reactions.

Adjacent the reaction centre heavy paraffin or the like can be placed to absorb $He^3$ and T which are produced by D-D reactions. These particles react with the deuterium ions in the paraffin.

Figure 5:
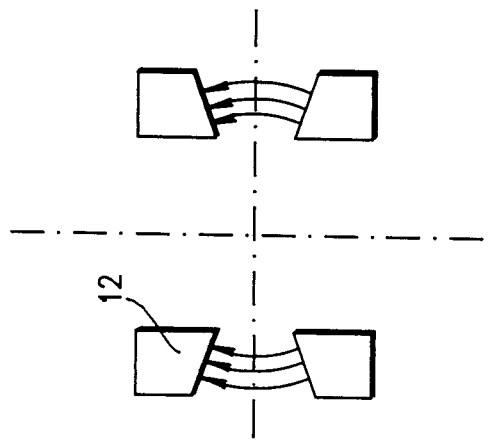
FIG. 5 is a schematic view of the design of the storage magnets.

By a magnetic field which varies in radial direction and is produced by annular magnets according to FIG. 5, the deuterium ions can be kept in a circular path in the field. Thus, magnet ring 12 for storage of the particles is designed such that the magnetic field decreases outwardly in radial direction. In such a field the particles perform so-called betatron oscillations about the median plane but are kept in a substantially circular path and the field captures also particles moving in another direction in this circular path. Thus, when particles which are scattered from the collision centre reach this area, they are captured anew in the circular path by cooperation between the magnetic field and the stochastic cooling, as described above. A charged particle which is moving in a circular path in this field, is influenced in the radial direction by a component force $$F_r = q \cdot v \cdot B$$

as well as by the centrapetal acceleration $$F_c = (mv^2)/r$$

equilibrium being attained when $$F_r = F_c$$

and any deviation from this equilibrium condition gives rise to a restoring force in radial direction.

Thus, the magnetic lines of force in the interior of storage magnet 12 are concave towards the central axis of the tank.

Figure 6:
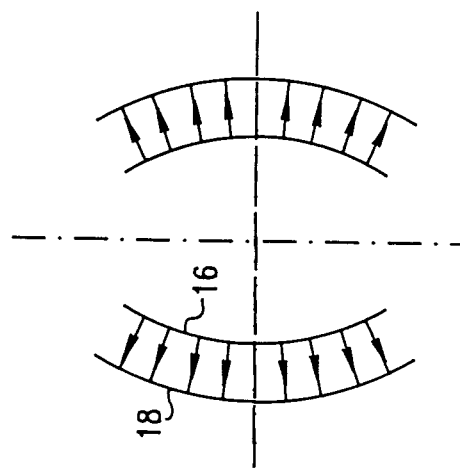
FIG. 6 is a schematic view of the design of the electrodes.

In oder to reduce the oscillations and further stabilize the ion beam electric fields are also used. FIG. 6 shows schematically the electrode configuration used to apply a substantially radial electric field in the area inside the storge magnet 12. These electrodes 16, 18 are essentially used to deflect the circulating ions inwardly towards a reaction centre, as will be explained in detail below.

Figure 8B:
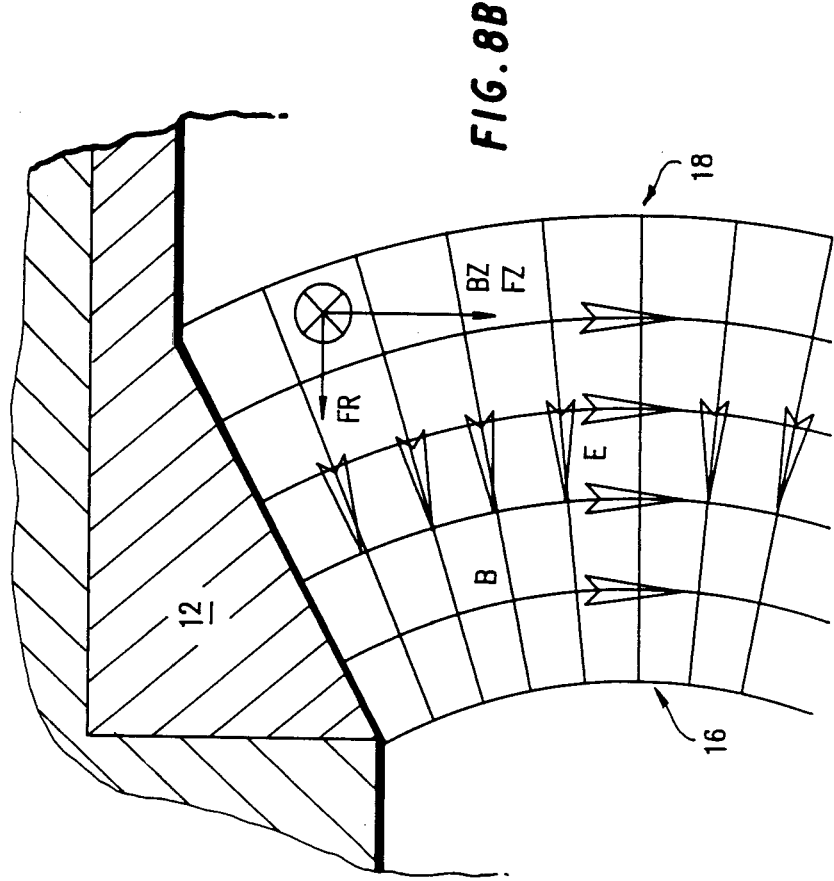
FIG. 8B is an enlarged detail view of FIG. 7 illustrating the forces acting on a charged particle which moves in the resulting fields.
Figure 7:
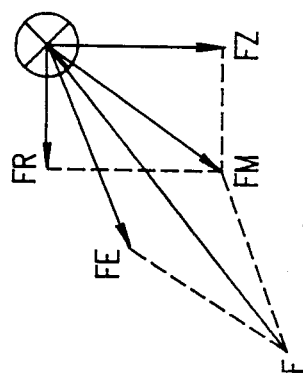
FIG. 7 is a resultant force diagram of the forces acting on a charged particle in FIGS. 8A and 8B.
Figure 8A:
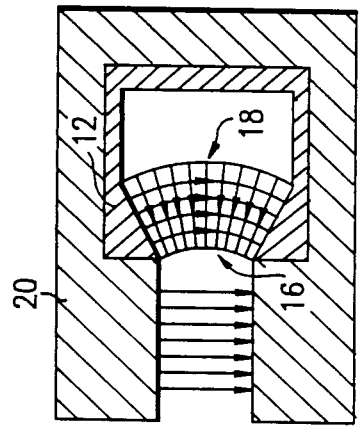
FIG. 8A shows the arrangement of the magnets and the electrodes with the resulting fields.

FIGS. 8A and 8B show the fundamental construction of magnets and electrodes for producing the required magnetic and electric fields. Thus, the apparatus includes mainly two annular magnets 12 and 20, respectively, the storage magnet 12 being disposed in a cavity in the magnet ring 20. The magnet ring 20, the so-called convergence magnet, generates a substantially homogenous field within the inhomogenous field, which the storage ring 12 generates, as discussed above.

The convergence magnet generates a stronger magnetic field than the storage magnet. Permanent magnets can be used.

As magnetic material $Co_5Sm$ (VACOMAX C) is suitably used. A field strength of 0.8 T can be obtained with a magnet gap of 1 cm. The material also exhibits good resistance against mechanical vibrations and can keep the magnetic field constant within a few percent up to a temperature of 250° C. Furthermore, the material has the advantage that it can be easily formed to desired shape.

The electrodes 16, 18 are disposed inside the storage ring 12 to give a substantially radial electric field.

A well focused deuterium ion beam with the energy in the range 0.1 to 3 MeV is injected into the reactor tank in the area inside the storage magnet 12 with the inhomogenous magnetic field B1 and the electric field E1 crossing each other. These fields are choosen so that the beam follows a path at the interior edge of the magnet 12 and the fields are advantageously designed to give a focusing effect.

By the inhomogenous magnetic field B1 the particles are influenced by a restoring force in the z-direction, when deviations from z=0 arise, FIG. 8B. Thus, so-called betatron oscillations arise in the z-direction around an equilibrium position. In a similar way oscillations in a radial direction arise caused by the difference between the Lorenz force and the centripetal force. These oscillations can be attenuated by the stochastic cooling described above.

The particle beam in the interior of storage magnet 12 is replenished during a suitably long period of time from the ion source, until the desired particle density is obtained. The electric field E1, which is applied on the electrodes 16, 18, is then lowered to 0 and the particle beam is deflected towards the centre of the magnet ring 20, the so-called convergence magnet. The magnetic field B2 which is produced by the magnet ring 20, has such a strength that the particles leave the area having the magnetic field B2 in a substantially radial direction towards the centre of the reactor tank.

Inside the convergence magnet magnetic and electric fields are lacking and hence, all particles, which have been injected into the storage ring 12, will move rectilinearly after having left the area inside the convergence magnet 20. Thus, they will reach the tank centre with a sufficient energy for fusion reactions.

Thus, some particles will be subjected to fusion reactions in the reaction centre while others will be scattered in various ways. The particles which have not participated in fusion reactions will again reach the magnetic field B2 inside the magnet ring 20, where they will be deflected and reach the magnetic field inside the storage ring 12 in such directions, that only minor corrections are required to capture them in the original circulating path. When the particles have reached a predetermined point in the field B1 the electric field E1 is then applied again with its original value. At the same time injection of new deuterium ions can be started to replenish the circulating deuterium beam with particles corresponding to those lost in the fusion reactions. The beam is stabilized and its density is replenished again. The deflection of the ions towards the reaction centre can be performed with the frequency $10^5$ to $10^6$ Hz, while, considering the energy balance, replenishment of particles is not required with a higher frequency than 100 to 1000 Hz.

Figure 9:
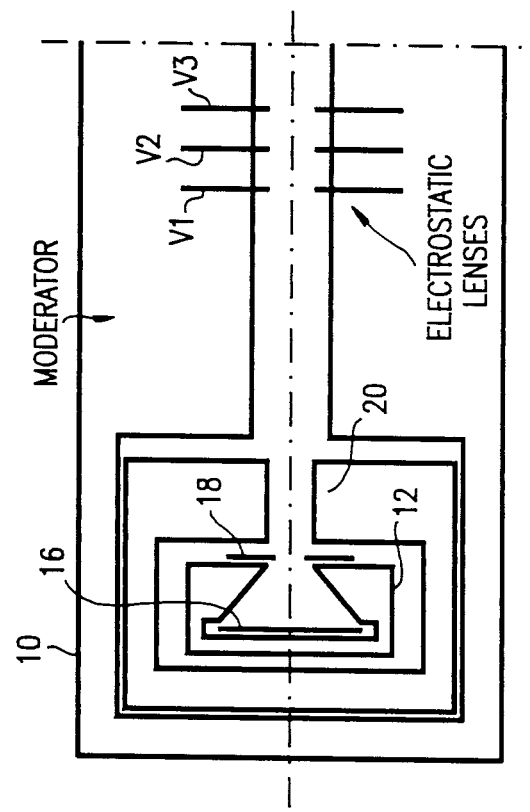
FIG. 9 is a schematic cross-sectional view showing the design of one of the halves of an embodiment of the apparatus according to the invention.

FIG. 9 shows a cross-sectional schematic view of one of the halves of the apparatus, the arrangement of heavy paraffin and lithium in the centre of the tank also being illustrated.

An electrostatic lens system, consisting of three electrostatic lenses $V_1$, $V_2$ and $V_3$, focuses the ions in the plane. The lenses $V_1$ and $V_3$ have the same potential and consequently, the lens system is symmetrical with the same focusing effect independently of the direction in which the ions pass the lens system. Such a lens system is described in more detail in F H Read, Inst. Phys. Conf., Ser. No. 38, 1978, Ch. 6, page 249.

Figure 10:
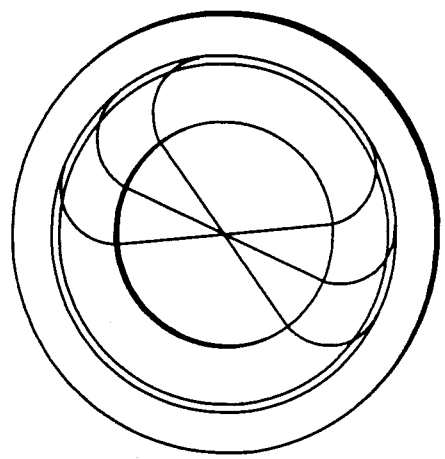
FIG. 10 shows simulated particle paths in the reactor to illustrate the function.

FIG. 10 shows the result of simulated particle paths in a configuration of electric and magnetic fields in accordance with the invention. The particle energy is 0.1 MeV, which corresponds to $3 \times 10^6$ m/s. It has been found that a radial electric field of $2 \times 10^4$ V/m is sufficient to control the particle beam as desired. Thus, FIG. 10 shows as has been described above, how the partial beam is stabilized in a substantially circular path, how the electric field is altered to zero and how the particle then is deflected into the magnetic field B2 which still more deflects the particle beam towards the reaction centre. When scattered particles again reach the inhomogenous magnetic field B1, the electric field has regained its original value and the particles fall in its original circulating path.

To operate the apparatus according to the invention energy for ionization of deuterium atoms and for their acceleration to the energy range of 0.1 to 3 MeV is required, further energy for generating magnetic and electric fields, as well as energy for vacuum pumps and control equipment is needed. To achieve a net production of energy the number of reactions must be sufficiently high so that the produced energy will exceed the sum of the energy demands mentioned above.

The reaction space in the centre of the apparatus can be designed in different ways. According to a first alternative the space is free from material.

By dividing the total number of particles in the circulating beam into a number of parts and by assuming that each part can collide with any one of the other parts of the beam, the produced energy can be calculated.

This energy can be calculated by the formula:

$$W = V_{DD} \cdot f \cdot E_r \cdot N_2 / V = 10^4 \text{ W}.$$

For a reaction volume $V = 4$ cm$^3$, calculated from the electrostatic energy balance, an amount of particles of $N = 10^{13}$ in the beam, a pulse frequency of $f = 10^5$, an energy produced in each reaction of $E = 10^{-12}$ J and a particle velocity of $v = 10^9$ cm/s, $W = 10^4$ W is obtained.

Another possibility is to fill the reaction space with deuterium gas. For a pressure of 1000 mm Hg in a volume of 1 cm$^3$, a production of $10^3$ J/s is obtained also in this case, remaining conditions being similar.

A third possibility is to use tritium gas in the reaction space and in this case an energy production of $10^5$ J/s is obtained.

It is also possible, in the reaction space, to use heavy paraffin which contains deuterium atoms, the obtained energy production then being estimated to $10^6$ J/s.

However, the possibility of maintaining the energy balance decreases in these latter methods. By filling the reaction centre with electrons (by an electron beam) it is possible to concentrate the reaction space, which has a favourable effect on the energy generation.

Figure 11:
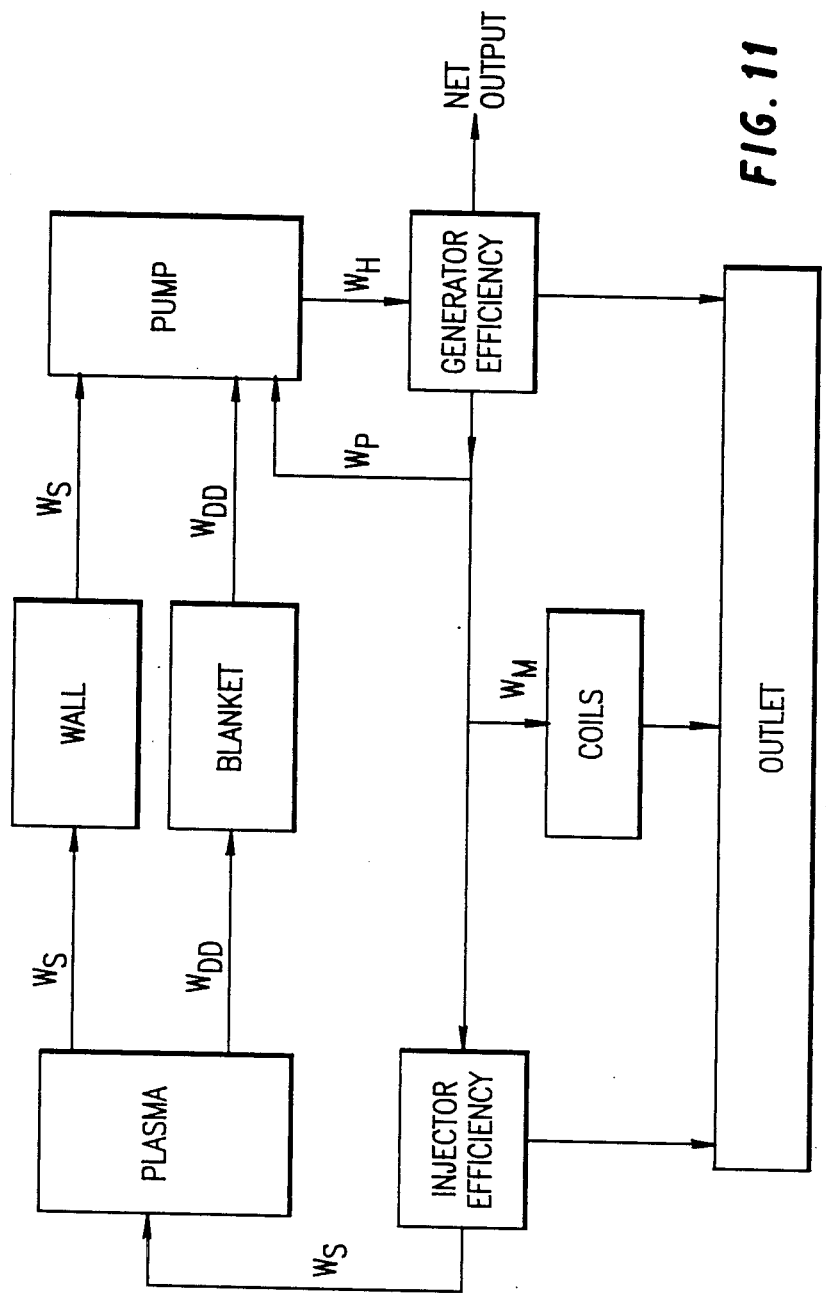
FIG. 11 shows the energy flow in the reactor.

The energy flow in the reactor is illustrated in FIG. 11. It is supposed that all energy which is delivered by the plasma can be used as useful heat.

The total amount of obtained heat per volume unit is the power density $W_{DD}$, which is produced by the fusion reactions, plus the injected power density $W_S$. For the following parameter values a net production is obtained.

$10^{10} < N < 10^{16}$
$0.01 < h_i < 0.10$
$0.4 < h_g < 0.8$
$h_p = 0.05$

N denoting the number of particles in the beam, $h_i$ injector efficiency, $H_g$ generator efficiency, i e the efficiency for the conversion heat-electricity and $h_p$ pump efficiency.

Additional energy is produced when the reaction products from the D-D reactions, e g tritium and He$^3$, react with deuterium contained in the blanket. Furthermore, a moderator is provided to slow down fast neutrons from the reactions. By using Li$^6$ in the blanket, additional energy is produced, since the reaction cross section of Li$^6$ for capture of thermal neutrons is large. Such additional reactions in the blanket actually increase the total amount of obtained energy per fusion reaction considerably, to the order of 25 MeV.

One advantage of the apparatus according to the invention in this context is that the reaction area is not heated, but the energy which is produced in the reaction will be recovered as heat in wall and blanket, where also other energy producing reactions can take place, as mentioned above.

In Table I numerical values are given for various important parameters of the reactor according to the invention.

The number of particles in storage magnet 12 can be increased if its radius is decreased as well as its pulse frequency. The result is that the energy yield remains constant independently of the radius.

The injected energy is quadrupled when the particles collide in the reaction centre. Thus, to obtain 100 keV in the centre only an injected beam of 25 keV is required and an injection of 250 keV is sufficient to attain 1 MeV in the centre. This of course results in advantages as to the energy balance and at the same time the scattering angle decreases.

The accuracy with which the particles can be brought to pass the reaction centre is determined by the accuracy of the particle paths in the outer magnet. This accuracy can be estimated to be of the order of magnitude of millimeters and the precision of the particle paths in the reaction centre consequently will be of the same order of magnitude.

It is also possible to connect several apparatus of the kind described above in parallel with common equipment for conversion of heat to electric energy, common vacuum pumps, etc. In this way a larger moderator volume is also obtained and a larger reaction volume and an improved total energy yield of the plant.

For the energy conversion the following principle can be used. A charged particle which is slowed down in an electric field, loses its energy and ends up with a low energy on one of the electrodes which consequently will have a higher charge. If constant potential between the electrodes is desired, a portion of the charge must be tapped, i e a current must be drawn.

For that reason two charged plates are arranged with an electric field applied between them in the centre of the apparatus with one plate positioned on each side of the plane of motion of the particles. A charged particle will then be slowed down, if the direction of the field is opposite to the direction of the motion. Those particles which, due to a Coulomb scattering get large scattering angles in relation to the plane of motion of the particles, will pass an electrode designed as a net, after which the particle is slowed down in the field. An electric current can then be drained off between the electrodes. In this way a high energy conversion efficiency will be achieved. This method can be applied on the particles which are solely subjected to Coulomb scattering, as well as on the reaction products. In the latter case the field must of course be stronger or several electrodes be used. Thus, by the combination of heavy paraffin, in which the particles are slowed down and produce heat, and the electrode system as described above, both heat and electric current are produced.

TABLE 1

| Parameter | Parameter value |
|---|---|
| Magnetic field in the storage magnet | 0.2 to 1.5 T |
| Electric field in the storage magnet | $10^4$ V/m |
| Ion energy | 0.1 to 3 MeV |
| Reaction rate | $10^{-14}$ to $10^{-12}$ cm$^3$/s |
| Particle density | $10^{10}$ to $10^{15}$ |
| Produced energy | 3.7 to 25 MeV/reaction |
| Cycle frequency | $10^5$ to $10^7$ Hz |
| Ion source efficiency | >0.01 |
| Operating pressure | $10^{-9}$ torr |
| Total heat converted into electricity with efficiency | 0.40 |
| Pumping power proportional to the amount of heat to be removed | 0.05 |

I claim:

1. An apparatus for a fusion reaction, comprising;
   two annular, coaxially disposed magnets arranged to produce magnetic fields in a vacuum tank, the inner magnet producing a homogeneous field, transversely to the plane in which deuterium ions are intended to circulate prior to a reaction, the outer magnet producing an inhomogeneous field which decreases outwardly in a radial direction and is also directed substantially transversely to said plane;
   controlling means for controlling the magnetic fields of the two magnets separately;
   means for ions to circulate with a constant path radius in said inhomogeneous magnetic field while accumulated;
   means being provided to determine the ion density in said path; and
   electrodes (16, 18) being provided to produce a radial electric field in the area having said inhomogeneous magnetic field and transversely to this inhomogeneous field, and in that a deuterium ion source (24), followed by coaxially disposed electrostatic lens electrodes ($V_1$-$V_3$), are disposed to inject ions in a path in said area with inhomogeneous magnetic field, a reaction center (34) being disposed in the tank in a magnetic field free area in the center of the inner magnet, towards which point ions in said path are intended to be deflected by reducing the radius of the path to zero by changing the electric field.

2. An apparatus according to claim 1, wherein;
   said ion source (24) includes a plasma gun with RF-heating, followed by a linear accelerator (26) for acceleration of the ions up to energies of 3 MeV.

3. An apparatus according to claim 1 or 2, further comprising;
   a system of quadropole lenses (32) is arranged to focus the accelerated ions for injection into the desired path in the vacuum tank.

4. An apparatus according to claim 1, wherein pick-up and kicker devices (36, 38) are provided alternately around the circumference of the area inside the outer magnet, each pick-up and kicker device including a coupling loop (8), and in that signals are generated in the coupling loops of the pick-up devices in response to the motion of the ion beam, which signals are supplied to the corresponding kicker devices to control the motion of the ion beam according to the pick-up signals.

5. An apparatus according to claim 1, wherein:
   the tank wall is made of steel or copper.

6. An apparatus according to claim 1, wherein:
   heavy paraffin containing deutrons with or without lithium is disposed around the reaction point (34) as a moderator and target for particles which are scattered from the primary reaction, as well as for energy conversion.

7. An apparatus according to claim 1, wherein:
   the outer annular magnet (12) is designed such that the lines of force of the inhomogeneous magnetic field are concave towards the central axis of the tank.

8. An apparatus according to claim 1, wherein:
   the outer annular magnet (12) is disposed to produce a magnetic field which can be varied in time to deflect the ions towards the reaction center.

9. An apparatus according to claim 1 wherein:
   the area around the reaction center (34) is filled with deuterium gas having a pressure of the order of 1000 mm Hg.

10. An apparatus according to, claim 1, wherein:
    the area around the reaction center (34) is filled with tritium gas.

11. An apparatus according to claim 1, wherein:
    the electrostatic lens electrodes form a 3-electrode electrostatic lens system ($V_1$-$V_3$) for focusing ions to their plane of motion.

* * * * *